United States Patent [19]
Steyer et al.

[11] Patent Number: 5,746,047
[45] Date of Patent: May 5, 1998

[54] INFRARED SUPPRESSOR

[75] Inventors: William Steyer, Topsfield; Timothy Joseph Higgins, Reading, both of Mass.

[73] Assignee: Gereral Electric Company, Cincinnati, Ohio

[21] Appl. No.: 396,209

[22] Filed: Jul. 8, 1982

[51] Int. Cl.[6] .................... F02G 3/00; B64D 33/04; B63H 25/46; F02K 3/04
[52] U.S. Cl. .................. 60/39.5; 60/264; 60/271; 239/127.3; 239/265.17; 239/265.19
[58] Field of Search .............. 60/39.5, 264, 265, 60/271; 181/213, 220, 224; 239/127.3, 265.13, 265.17, 265.19

[56] References Cited

U.S. PATENT DOCUMENTS

| | | | |
|---|---|---|---|
| 3,210,934 | 10/1965 | Smale | 60/265 |
| 3,693,880 | 9/1972 | Versaw et al. | 239/127.3 |
| 3,889,882 | 6/1975 | Hull, Jr. et al. | 239/127.3 |
| 3,921,906 | 11/1975 | Nye et al. | 239/127.3 |
| 3,970,252 | 7/1976 | Smale et al. | 239/127.3 |
| 3,981,143 | 9/1976 | Ross et al. | 60/264 |
| 4,002,024 | 1/1977 | Nye et al. | 60/262 |
| 4,004,416 | 1/1977 | Amelio et al. | 60/264 |
| 4,007,587 | 2/1977 | Banthin et al. | 60/39.5 |
| 4,018,046 | 4/1977 | Hurley | 60/264 |
| 4,044,555 | 8/1977 | McLoughlin et al. | 60/264 |
| 4,095,417 | 6/1978 | Banthin | 60/264 |
| 4,136,518 | 1/1979 | Hurley et al. | 60/264 |
| 4,215,537 | 8/1980 | Hurley | 239/127.3 |
| 4,295,332 | 10/1981 | Steyer et al. | 60/264 |

FOREIGN PATENT DOCUMENTS

| 1245241 | 1/1960 | France | 60/264 |
|---|---|---|---|

*Primary Examiner*—Charles T. Jordan
*Assistant Examiner*—Theresa M. Wesson
*Attorney, Agent, or Firm*—Andrew C. Hess; Nathan D. Herkamp

[57] ABSTRACT

An infrared suppressor system for a gas turbine engine is provided for suppressing infrared radiation associated with the hot metal parts of the engine and with the hot exhaust gases exhausted from the engine. The system features a unique arrangement of multiple baffles that are connected together as a single baffle module. The baffle arrangement permits mixing of hot and cool gas flows while eliminating line-of-sight infrared radiation in an axially compact suppressor. The baffles are additionally linked together into a single insertable baffle module that permits removal of the baffle module when infrared suppression is unnecessary.

9 Claims, 2 Drawing Sheets

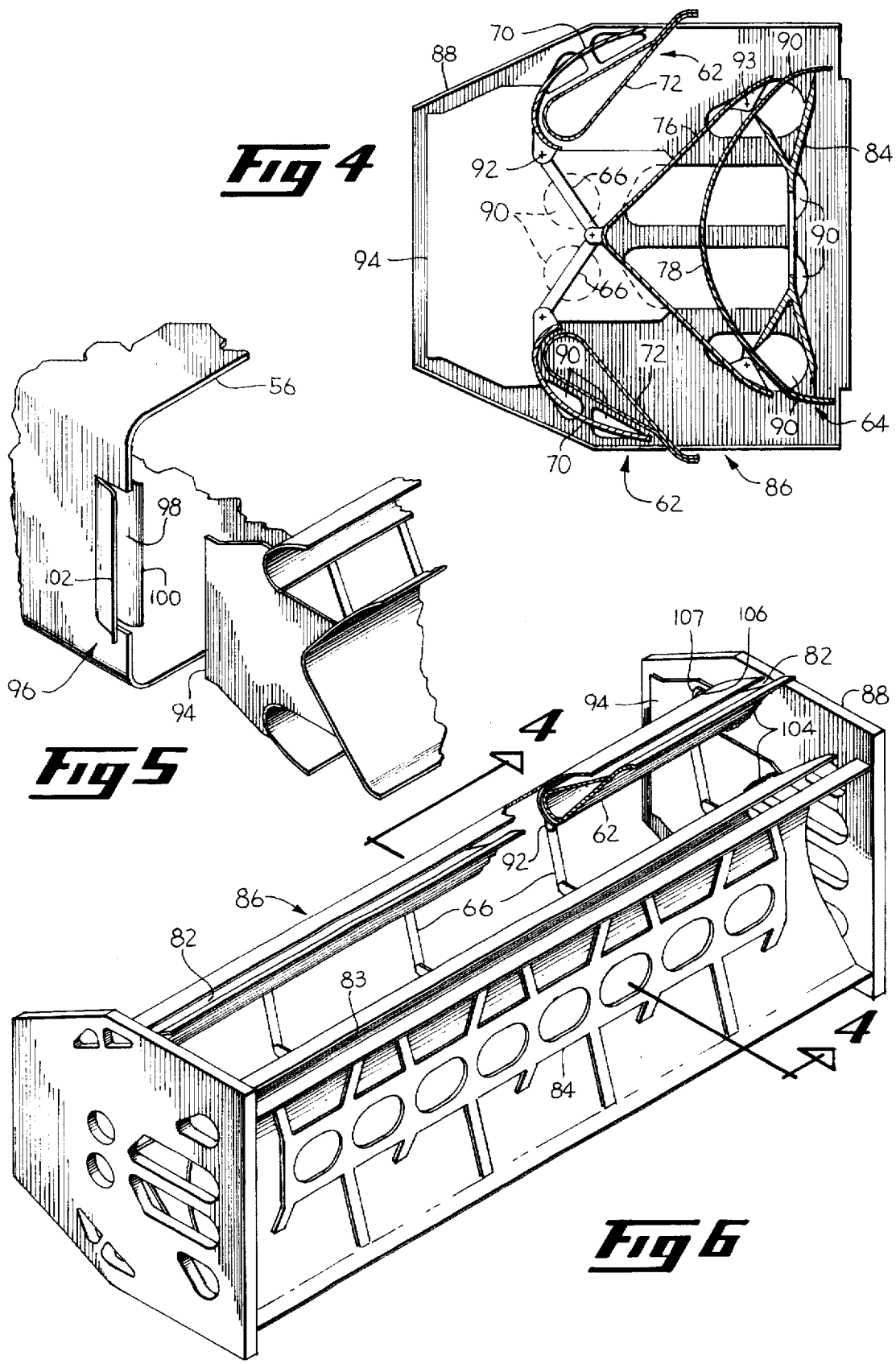

INFRARED SUPPRESSOR

The Government has rights in this invention pursuant to Contract Number DAAK50-81-C-0030 awarded by the U.S. Army.

CROSS REFERENCE TO A RELATED APPLICATION

This present application is copending and concurrently filed with another patent application entitled "Removable Baffle Infrared Suppressor," Tom Chew, et al, Ser. No. 396,210 filed on 8 Jul., 1982.

BACKGROUND OF THE INVENTION

1. Field of the Invention

This invention relates to an infrared suppressor system for a gas turbine engine, and more specifically, to an infrared suppressor system which blocks the line of sight into the engine and which provides for mixing of cooling air with the hot exhaust gases of the engine.

2. Summary of the Prior Art

With recent advancements in weapons detection technology, there is growing recognition, in the field, of the importance of reducing the infrared signature associated with gas turbine engines powering military aircraft. Signature reductions reduce the possibility of detection and pursuit by enemy anti-aircraft forces including heat-seeking missiles. In the past, various apparatus have been utilized to suppress infrared radiation from gas turbine engines. Generally, these prior art devices admit to two categories: one in which a center plug is disposed in the exhaust flow and cooperates to block the line of sight to the hot turbine parts of the engine; and the other of which blocks line of sight by ejecting the hot gases from the suppressor at substantial angle from the axial center line of the engine.

Prior art suppressors of the type just mentioned have been numerous. Improved suppressors have been developed to provide size and weight advantages and minimize installation penalties. An example of such an improvement is disclosed in U.S. Pat. No. 4,295,332, Steyer et al, which shows the use of splitters that perform a dual function of mixing hot and cool gas flows to reduce gas temperatures and also block line-of-sight infrared radiation. Since the conception of the suppressor disclosed in U.S. Pat. No. 4,295,332, further developments have made possible even more compact and higher performance suppressor construction arrangements.

It is, therefore, a primary object of the present invention to provide an improved infrared radiation suppressor system for a gas turbine engine in a construction arrangement that is compact yet allows acceptable levels of engine performance.

It is another object of the present invention to provide an infrared radiation suppressor which obstructs the line of sight of the hot turbine parts of the engine without unacceptable performance losses with the suppressor installed on the engine.

It is another object of the present invention to provide an infrared suppressor which provides complete and thorough mixing of hot exhaust gases with cooler ambient air to effect a reduction in the signature of the exhaust plume in a compact arrangement with acceptable losses of engine performance.

SUMMARY OF THE INVENTION

These and other objects of the invention which will become apparent from the following detailed description and the accompanying drawings are accomplished by the present invention which, in one form, provides an apparatus for suppressing infrared radiation emitted from the hot metal parts at the aft end of a gas turbine engine and from a stream of exhaust gases flowing out the aft end during engine operation. More specifically, the present invention provides duct means adapted to receive the stream of hot gases from the engine and to confine the exhaust gases to flow through the duct. The duct is provided with opening means that permits a cooling gas flow, such as engine bay air to enter the interior of the duct. A pair of outer baffle assemblies are disposed in a region downstream of the opening means. To some degree, the acceleration of the engine's exhaust gas flow that is caused by the outer baffle assemblies will tend to create a low pressure area that will draw cooling air through the opening means into the exhaust gas flow. An inner baffle assembly is generally disposed at least partly between and at least partly downstream of the outer baffle assemblies. The outer baffle assemblies split the exhaust gas flow into two outer and an inner flowstream. The inner baffle assembly then splits the inner gas flow into an upper and lower inner flowstream. It can be appreciated that this combination of baffles breaks down what is originally a single hot exhaust flowstream into four separate flowstreams. In the process of breaking down the flowstream, the baffles tend to draw cooling air through opening means into the exhaust flow stream while simultaneously blocking line-of-sight infrared radiation. All of this is accomplished with a unique and compact baffle arrangement that is incorporated into a single baffle module.

The baffle assemblies used for splitting the flow streams are also provided with side openings for the purpose of drawing additional cooling air into the baffles. The baffles are constructed with air outlet holes in their downstream facing walls. The cooling air drawn into the baffles through the side openings is released into the exhaust gas flow in a controlled manner through these cooling air outlets. The cooling air is caused to flow in this direction because of an ejector action induced by pressure differences between exhaust gas flow just downstream of the cooling air outlet holes and the pressure inside the baffles. The effect of the ejector action is to provide an additional source of diluting cooling air flow into the exhaust flowstream across the aft faces of the three baffle assemblies.

DESCRIPTION OF THE DRAWINGS

While the specification concludes with the claims distinctly claiming and particularly pointing out the invention described herein, it is believed that the invention will be more clearly understood by reference to the discussion below in conjunction with the following drawings:

FIG. 4 is a side view of a portion of the baffle module shown in FIG. 6 as employed in the present invention.

FIG. 5 is a perspective view showing baffle module insertion features in the present invention.

FIG. 6 is a perspective view of the baffle module employed in the present invention.

DESCRIPTION OF THE PREFERRED EMBODIMENT

Figure 1:
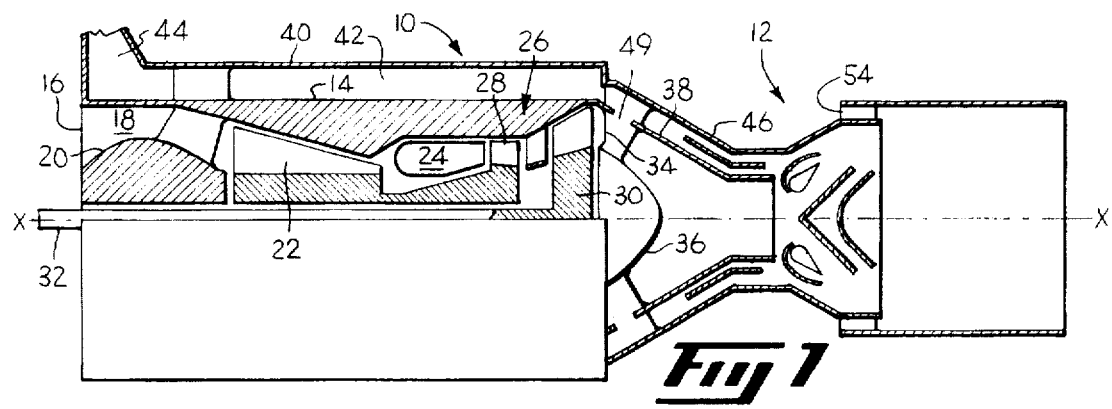
FIG. 1 is a schematic view, partly in cross-section and partly broken away, of a typical gas turbine engine shown in combination with an infrared suppressor system embodying the present invention.

Referring now to FIG. 1, there is shown a schematic representation of a gas turbine engine depicted generally at 10 in combination with the infrared suppressor of the present invention depicted generally at 12. The gas turbine engine 10 includes an outer casing 14 open at an upstream end to provide an airflow inlet 16. An annular passageway 18, defined by the outer casing 14 and inner fairing 20, extends axially from the inlet 16 to an aft end of the engine. Air entering the inlet 16 flows along the annular passageway 18 sequentially through a compressor section 22 where inlet air is compressed and discharged into a combustor 24. Inside this combustor 24, the compressed air is mixed with fuel and burned to produce a high-energy, hot gas stream that exits the combustor and enters a turbine section 26.

The high-energy gas stream, which may have a temperature in excess of 2400° Fahrenheit (1316° Centigrade), is directed at turbine blades to drive a high-pressure turbine 28 which is connected mechanically to drive the compressor 22. After passing through the high-pressure turbine, the high-energy gas stream flows through a power turbine 30 which drivingly connects to a power turbine shaft 32 that can be used to power an external mechanism, such as rotating helicopter blades.

For purposes of this description hereinafter to follow, the term "axial direction" or the like shall mean a direction along the x—x line as shown in FIG. 1, which corresponds to a center line of the engine. The term "radial direction" or the like shall mean a direction along a line perpendicular and passing through the x—x line. The term "circumferential direction" or the like shall mean a direction along a line the locii of points of which circumferentially surround the x—x axis.

After passing through the two turbine sections, the hot exhaust gas flow stream is exhausted from the engine 10 through an annular exhaust outlet 34 defined generally between a center plug 36 and a fixed outer shroud 38 which may be part of the outer casing 14. An axially extending hollow cylindrical shell 40 surrounds casing 14 and is spaced apart therefrom so as to form an engine bay cavity 42 therebetween. Cool engine bay air is directed into the cavity 42 through inlet 44.

It will thus be appreciated that the gas turbine engine so far described is of the conventional turboshaft type wherein the power turbine shaft 32 may be connected to drive rotor blades of a helicopter. It will also be appreciated that although a gas turbine engine of the turboshaft type has been herein described, other types of gas turbine engines such as turbofan and turboprop engines may be suitable for use with the infrared suppression system of the present invention.

The infrared suppressor 12 is disposed immediately aft of the engine 10. The suppressor is composed generally of an axially extending elongated duct 46, which receives the flow of hot gases from the engine 10 and serves to generally confine that flow of hot gases. Duct 46 is comprised of three stages or sections arranged sequentially, one after the other in the axial direction. The first is a transition section 48 that is circular at its upstream end where it receives exhaust gas from the engine 10 and transitions to a rectangular section at its downstream end. The second is an intermediate section 50 within which internal baffle structures are disposed. The third is a downstream duct section 52 through which the engine's exhaust gases are finally exhausted out into the ambient atmosphere. Ambient air inlets 54 are provided for admittance of relatively cool ambient air into the interior of the infrared suppressor 12 in a manner to be hereinafter described.

Figure 2:
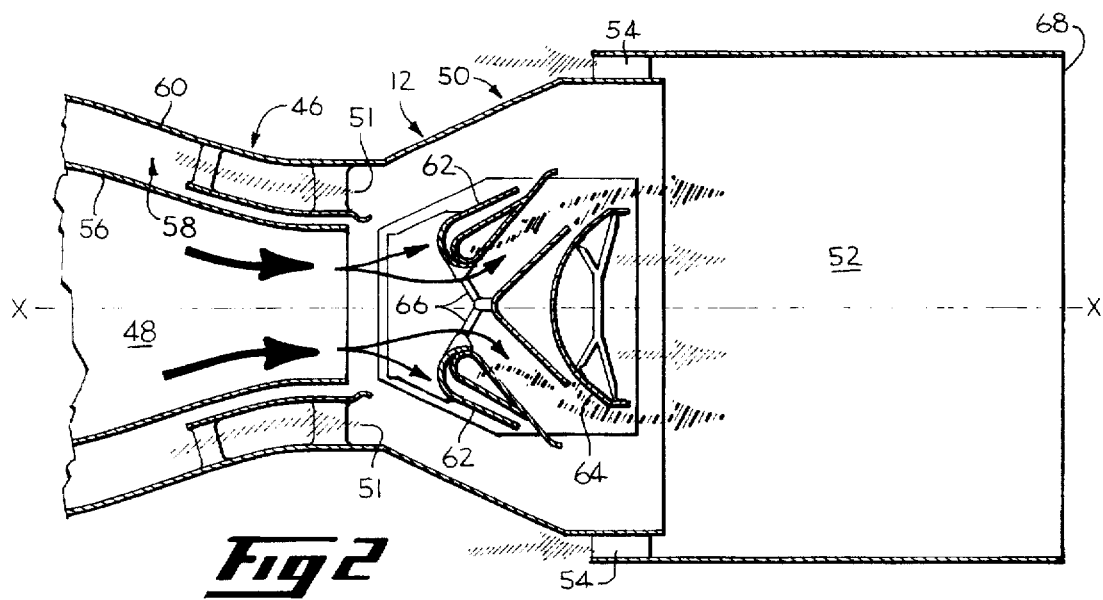
FIG. 2 is a cross-sectional schematic view of the infrared suppressor system embodying the present invention.

Referring now to FIG. 2, there is shown a cross-sectional schematic representation of the infrared suppressor 12 and the internal structures disposed therein. In the transition section 48 the hot engine exhaust gases are received at an upstream end and transition from a generally circular cross-sectional flow pattern to a generally rectangular cross-sectional flow pattern at a downstream end of the transition section 48 where it connects to the intermediate section 50. Transition of hot air flow will involve, to some degree, a decrease in vertical height of the hot gas flowpath as seen in FIG. 2. However, it should be appreciated that while the vertical height of the flowpath is decreasing, the horizontal length of the hot gas flowpath is increasing, resulting in relatively little change in total cross-sectional area of the hot gas flowpath through the transition section 48.

It shall be appreciated by the reader that the path of the hot gases through the suppressor 12 are generally shown by the solid black arrows in FIG. 2. In contrast to the hot gas flows, cool airflow through the suppressor 12 is generally represented by the diagonally lined arrows. These arrows are provided to aid the reader in generally understanding the mixing process of cool airflows with hot gasflows taking place during engine operation inside the suppressor 12.

The transition section 48 includes an inner liner 56 that extends axially through the transition section 48. Relatively cool engine bay air coming from the engine bay cavity and ambient air is drawn into a liner region 58 extending between the inner liner 56 and an outer duct wall 60. This relatively cool air is drawn into this liner region 58 because of pressure forces within the suppressor 12 that occur as a result of the rapid flow of the hot exhaust gases through the suppressor.

In addition, some of the engine bay air is drawn directly into the exhaust flowpath through a gap 49 (FIG. 1) between the engine 10 and the suppressor 12.

The hot exhaust gases leave the transition section 48 at its downstream end and enter the intermediate section 50. The cooler engine bay air enters that intermediate section 50 at openings 51. The intermediate section 50 contains three baffle assemblies including a pair of outer baffle assemblies 62, and in inner baffle assembly 64. Each of these baffle assemblies is comprised of two separate baffles, a hot baffle and a cold baffle, the structure of which will be more particularly described later in this specification. The outer baffle assemblies 62, disposed just downstream of an opening or openings 51, divide the flow of hot exhaust gases into two outer flows and an inner gas stream flow. The inner baffle assembly 64, which is disposed at least partly between and at least partly downstream of the outer assemblies 62, serves to divide the inner gas stream flow into an upper and lower inner gas stream flow. This dividing of flows results in four separate gas flows that recombine further downstream in the suppressor.

Each of the baffle assemblies extends transversely across the interior of the duct 46 and is open to the outside air through the outer duct wall 60. The baffle assemblies can thereby draw cool ambient air from outside the suppressor 12 into the interior of the baffle assemblies and thereafter discharge the cool ambient air into the exhaust flow stream through downstream surfaces of the baffle assemblies. To some degree, this flow of cool air out of the baffle assemblies is generally shown by the diagonally lined arrows emanating from the baffle assemblies in FIG. 2.

In addition to the cooling air drawn into the exhaust region through the baffle assemblies, another source of relatively cool air is the engine bay air and outside ambient air drawn through the liner region 58 into the intermediate section 50. It can thus be appreciated that a great deal of mixing of hot and cool airflows occurs inside the intermediate section 50.

The outer baffle assemblies 62 are structurally connected to the inner baffle assembly 64 with baffle struts 66 that have pivotal connections to the outer portions of the baffle assemblies. The pivotal connections permit the baffle assemblies to be structurally linked in a manner that allows relative thermal expansion and contraction of the baffle assemblies during engine operation.

At a downstream end of the intermediate section 50 the hot and cool gas flows that have been mixed together are directed into the downstream duct section 52. Ambient air inlets 54 are provided at the connection between the intermediate section 50 and the downstream duct section 52 for the purpose of drawing additional cool ambient air into the suppressor 12 to mix with the exhaust gas flows. The downstream duct section 52 is made sufficiently long so that there is no direct line-of-sight viewing of hot metal parts through a suppressor exhaust opening 68 to any relatively hot parts inside the suppressor 12. This is very important to prevent direct infrared radiation from emanating from the engine 10 out of the opening 68.

Figure 3:
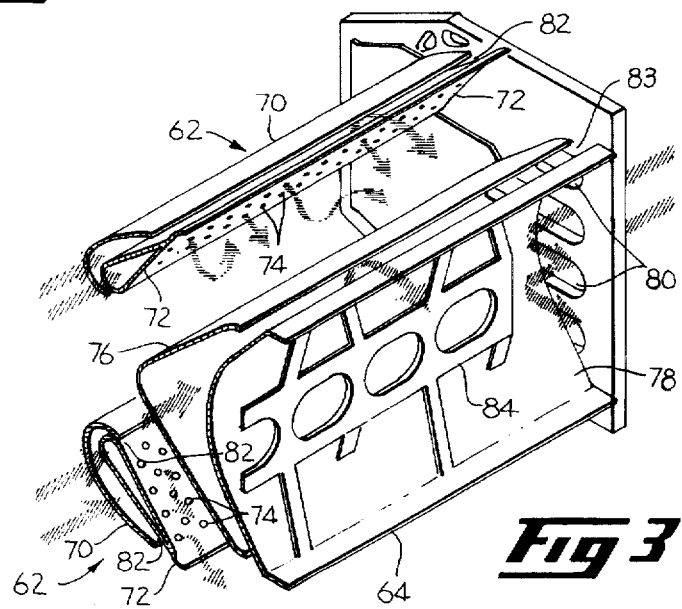
FIG. 3 is a cross-sectional perspective view of a baffle module and cooling airflows associated with the baffle module in the present invention.

Referring now to FIG. 3, the baffle assemblies 62 and 64 are shown in greater detail to permit the reader to better appreciate the structure of these baffle assemblies and the flow of cooling air therethrough. The larger black diagonally lined arrows in FIG. 3 generally represent a flow of ambient cool air through the outer duct wall 60 (not shown) into the ends of the baffle assemblies. The smaller black arrows represent a flow of this same cooling air from interior regions of the baffle assemblies out into the exhaust gas flow stream flowing through the suppressor.

The outer baffle assemblies 62 are each comprised of a hot baffle 70 and a cold baffle 72. The hot baffle 70 is directly exposed to hot exhaust gas flow exhausted by the engine 10. The hot baffle 70 is also directly exposed to hot engine parts inside the engine and, therefore, will reflect infrared radiation emanating from the hot engine parts.

The cold baffles 72 are not directly exposed to the hot exhaust gas flow because they are protected at their upstream surface by the hot baffles 70. Because of this protection along their upstream surface, the cold baffles 72 attain a relatively low temperature in comparison to the hot baffles 70. This is very important because the cold baffles 72 can be viewed by direct line of sight from the higher suppressor exhaust opening whereas the hot baffles 70 can only be viewed by at least two bounce reflections.

The cold baffles 72 are also maintained at a relatively cool temperature by the cooling ambient air flow that enters from outside the suppressor through the outer duct wall into the baffles and is distributed out of baffle outlet holes 74 and slots 82 into the exhaust gas flow stream. This cooling airflow serves to both keep the cold baffle 72 at a relatively low temperature and also lowers the overall temperature of the exhaust gas flow. The size and location of the baffle outlet holes 74 is such that the ambient air is exhausted uniformly across the entire downstream face of the cold baffle 72. This prevents eddies of hot exhaust gases from creating "hot spots" on the cold baffle 72.

The inner baffle assembly 64 is also comprised of a hot baffle 76 and a cold baffle 78. It can be readily appreciated that the upstream surface of the cold baffle 78 is protected from the direct impingement of hot flow gases by the hot baffle 76. Again, it is extremely important that the cold baffle 78 be kept at a relatively cool temperature because it is directly viewable from the suppressor exhaust opening. The cold baffle 78 of the inner baffle assembly 64 is additionally cooled by ambient air in much the same manner as the cold baffle 72 of the outer baffle assembly 62. Cool air is drawn through inner baffle side openings 80 into the interior of the inner baffle assembly 64. From the interior, this cooling air is exhausted through inner baffle slots 82. Again, this cooling airflow serves to both cool the cold baffle 78 and additionally to cool the airflow that mixes with the hot exhaust flow gases to generally lower the temperature of the exhaust flow leaving the intermediate section. An inner baffle cross piece 84 is provided for the purpose of adding structural rigidity to the inner baffle assembly 64.

Referring now to FIG. 4, a side view is shown of a baffle module 86 that includes both the inner baffle assembly 64 and the outer baffle assemblies 62. The baffle module 86 is a unique structure that integrates and supports all of the individual baffles employed in the present invention in a single structure that can be removed from the interior of the suppressor. The integration of all the baffles into a single assembly additionally provides an inherent structural strength and integrity which is very desirable in the exhaust section of an engine where the forces of the exhaust gases create stresses on anything blocking their flow path. Another advantage to the single baffle module is that the individual baffles can be maintained in their proper relative location in such a way as to block line-of-sight viewing of hot metal parts from outside the suppressor exhaust opening.

As stated earlier, the individual baffles extend transversely across the interior of the infrared suppressor. All of these baffles are held together at their end portions with two cold baffle end plates 88, one at each end of the baffle module 86. The cold baffle end plates 88 are structurally connected to the baffles with short flanges and spot welds (not shown in FIG. 4).

The end plates 88 are provided with end plate air holes 90 that permit cool ambient air to flow through the end plates into the inner baffle assembly 64 and outer baffle assemblies 62. These air holes 90 are positioned and sized appropriately to permit the proper amount of cool ambient air to enter the baffle assemblies and to appropriately direct this ambient air. It can be readily appreciated that the size and location of these air holes 90 can be varied significantly as long as a proper amount of cool, ambient air is permitted to enter the baffle assemblies during engine operation.

The structural linking of the baffle assemblies, and its inherent ability to permit thermal expansion and contraction of the individual baffles, can be generally appreciated from FIG. 4. During engine operation, the hot baffles 70 and 76 are positioned directly in the path of the hot exhaust gases exhausted from the engine and are therefore referred to as "hot" baffles. These "hot" baffles 70 and 76 are directly linked together by baffle struts 66 having pivotal connections 92 at the ends of the struts. The links 66 and their associated pivotal connections 92 permit the hot baffles to expand and contract thermally while at the same time maintaining a proper positioning of the hot baffles and a structural rigidity that is necessary to withstand the exhaust gas pressure forces.

Similarly, the cold baffles 72 and 78 are protected from the flow of hot exhaust gases by their corresponding hot (upstream) baffles 70 and 76 respectively. Because they are protected from the hot exhaust gases, the downstream baffles 72 and downstream inner baffle 78 are referred to as "cold" baffles. When necessary, the "hot" baffle 76 is structurally connected with additional pivotal connections 93 to the cold baffle 78. The additional pivotal connections 93 permit the baffles to expand and contract thermally in respect to the attached baffle while still being structurally linked thereto and, very importantly, properly protected from the hot flow of exhaust gases. This ensures that the cold baffles, which are exposed to direct line-of-sight viewing from outside the infrared suppressor, will continuously be protected from the hot exhaust gases during engine operation which is essential to prevent them from becoming "hot" and emitting undesirable amounts of infrared radiation.

While the baffle module 86 is a structure with many inherent advantages, it is necessary that the baffle module 86 be attached to the outer duct wall 60 (not shown in FIG. 4) in a manner that prevents the hot exhaust gases from impinging on the outer duct wall 60 (not shown in FIG. 4). This function is accomplished by hot baffle end plates 94 that are provided at each end of the baffle module 86. The hot baffle end plates 94 are structurally linked to the "hot" baffles by means of short flanges, seals and spot welds (or brazing).

Referring now to FIG. 5, an inner duct seal 96 is shown that permits the hot baffle end plates 94 to be connected and sealed to the inner liner 56 of the suppressor. This inner duct seal 96 provides a means whereby the hot flow of exhaust gases flows from the transition section of the infrared suppressor into the intermediate section which contains the baffles, without permitting the hot exhaust gases to impinge upon the outer duct wall 60. This is desirable in order to prevent the outer duct wall 60 from being heated by the hot exhaust gases to a degree which would cause undesirable amounts of infrared radiation to be radiated by the outer duct wall 60. The inner duct seal 96 also permits the baffle module 86 to be removed or inserted at will from within the infrared suppressor.

To create this inner duct seal 96, the hot baffle end plates 94 insert directly into inner seal grooves 98 with a tongue and groove type arrangement. The inner seal grooves 98 are comprised of an inner seal flap 100 and an outer seal flap 102. These flaps 100 and 102 create an interference fit that readily accepts the hot baffle end plates 94 when the baffle module 86 is inserted into the infrared suppressor. After insertion of the baffle module 86, the hot baffle end plates 94 generally align with the inner liner 56, creating a continuous flow path for the hot exhaust gases.

Referring now to FIG. 6, a perspective view of the entire baffle module 86 is shown to assist the reader in better appreciating the general configuration of this unique assembly. It can be readily appreciated that the baffle module 86 comprises a single integrated baffle structure that can be conveniently inserted or removed manually from the infrared suppressor by an engine operator. This removable feature offers a significant performance advantage. An aircraft utilizing the infrared suppressor during non-combat conditions can be operated without the suppressor baffle module 86, which inherently tends to block exhaust gas flow and cause some associated engine performance penalties. However, if the aircraft is being operated under combat conditions, it is desirable to reduce infrared signature even though this causes some degree of engine performance penalty and the baffle assembly 86 can be conveniently inserted to achieve this. It is easily seen in FIG. 6 that the outer baffle assemblies 62 and inner baffle assembly 64 are linked together with baffle struts 66 and, additionally, are linked at their end portions with cold baffle end plates 88. In addition, seals 107 attached to the hot baffles 70, engage the hot baffle end plates 94 and allow the hot baffles 70 to thermally expand with respect to the end plates 94, while preventing hot gases from impinging on the outer duct wall of the suppressor. This structural linking provides a very strong, rigid, integral structure that, as described earlier, inherently permits thermal expansion and contraction of individual baffles. The slots 82 from which relatively cool ambient air is exhausted by the baffle assemblies can also be seen in FIG. 6. It can be readily appreciated that, because the slots 82 open in a downstream direction, the pressure forces created by the flow of hot exhaust gases would tend to create a low-pressure region at the opening of the slots 82, which will induce the cool ambient air to flow into the baffle assemblies and out of the slots 82. The slots are sized and located appropriately to encourage this pressure differential and to permit an appropriate amount of cool ambient air to flow through the slots 82 during engine operation.

Flanges 104 extending from the hot baffle end plates 94 and cold baffle end plates 88 are connected to the baffle structures with spot welds 106. This type of connection is utilized because of its inherently low cost, although other connection means might also be utilized.

While a preferred embodiment of the present invention has been fully described in order to explain its principles and structural elements, it is to be understood that various modifications or alterations or their embodiments might be utilized without departing from the scope of the appended claims.

Having described the invention, what is claimed and desired to be secured by Letters Patent of the United States is:

1. An apparatus for suppressing infrared radiation emitted from hot metal parts at an aft end of a gas turbine engine and from a stream of hot exhaust gases flowing therefrom during operation of the engine, comprising:

a duct having an exhaust opening at an aft-most end thereof, said duct being effective for receiving the stream of hot exhaust gases from said engine, said duct adapted to generally confine said exhaust gases to flow through said duct;

a pair of outer baffle assemblies disposed in said duct for dividing said gas stream into a first outer, a second outer, and an inner gas stream flow;

an inner baffle assembly disposed at least partly between and downstream of said outer baffle assemblies for dividing said inner gas stream flow into upper and lower flowstreams for mixing with said first and second outer gas stream flows, respectively;

said inner and outer baffle assemblies and said duct cooperating to obstruct the line of sight of said hot metal parts when said engine is viewed from said exhaust opening; and said duct having opening means for receiving a cooling gas flow into said duct for mixing with said first and second outer gas stream flows and wherein said baffle assemblies are disposed downstream of said opening means.

2. The apparatus recited in claim 1 wherein each of said baffle assemblies is provided with baffle side openings for drawing ambient air into said baffle assemblies and outlet apertures for distributing said ambient air into said hot exhaust gases.

3. The apparatus recited in claim 1 wherein each of said baffle assemblies is comprised of a hot baffle and a cold baffle wherein said hot baffle faces generally in an upstream direction from said cold baffle and protects the cold baffle from the stream of hot exhaust gases during engine operation, said baffle assemblies including side openings for channeling cooling air to said cold baffles.

4. The apparatus recited in claim 1 wherein said baffle assemblies are linked together with struts to form a single integrated baffle module.

5. The apparatus recited in claim 4 wherein said baffle module is provided with end plates structurally linking end portions of the baffle assemblies.

6. An apparatus for suppressing infrared radiation emitted from hot metal parts at an aft end of a gas turbine engine and from a stream of hot exhaust gases flowing therefrom during operation of the engine, comprising:

a transition section for receiving the stream of hot exhaust gases from said engine, said transition section being shaped to transition the stream of exhaust gases from a generally circular cross-sectional flow pattern;

an intermediate section connected to said transition section for receiving the stream of exhaust gases, said intermediate section being provided with a baffle module comprising a pair of outer baffle assemblies and an inner baffle assembly, said inner baffle assembly being disposed at least partly downstream of and between said outer baffle assemblies, said baffle assemblies being provided to divide said stream of hot exhaust gases into several streams and to block line-of-sight viewing of hot engine parts from outside said apparatus;

a downstream section connected to said intermediate section for receiving said several streams of hot exhaust gases and confining said streams to be exhausted through a suppressor exhaust opening; and said duct having opening means for receiving a cooling gas flow into said duct for mixing with said first and second outer gas stream flows and wherein said baffle assemblies are disposed downstream of said opening means.

7. The apparatus recited in claim 6 wherein said intermediate and downstream sections are rectangular in cross-section.

8. An infrared suppressor for a gas turbine engine having an exhaust outlet and an engine bay cavity disposed circumferentially therearound comprising:

a duct having an inlet end effective for separately receiving hot exhaust gases from said exhaust outlet and cool engine bay air from said bay cavity, and an outlet end for discharging gases from said duct;

a pair of outer baffle assemblies disposed in said duct and defining between each other an inner flow channel effective for receiving a portion of said exhaust gases from said exhaust outlet, and defining with said duct first and second outer flow channels effective for receiving both said cool engine bay air from said bay cavity and a portion of said exhaust gases from said exhaust outlet, said outer baffle assemblies each comprising a first hot baffle facing in an upstream direction and a first cold baffle disposed downstream of said first hot baffle and protected thereby from said exhaust gases;

an inner baffle assembly disposed downstream of said pair of outer baffle assemblies and having a second hot baffle spaced between and generally aligned at common axial positions with said first cold baffles of said outer baffle assemblies, and a second cold baffle disposed downstream of said second hot baffle and protected thereby from exhaust gases flowable through said inner flow channel, said second hot baffle defining with each of said first cold baffles upper and lower flow channels, respectively, in flow communication with said inner flow channel;

said first and second cold baffles being positioned with respect to said duct for obstructing the line of sight of said exhaust outlet and said first and second hot baffles as viewed from said outlet end of said duct, and said first and second outer flow channels and said upper and lower flow channels transitioning to define two channels being effective for discharging gases through said outlet end of said duct around said inner baffle assembly.

9. An infrared suppressor according to claim 8 wherein said outer and inner baffle assemblies are provided with baffle side openings for channeling ambient air through outlet apertures thereof for cooling said first and second cold baffles and for mixing with said exhaust gases.

* * * * *

UNITED STATES PATENT AND TRADEMARK OFFICE
CERTIFICATE OF CORRECTION

PATENT NO. : 5,746,047
DATED : May 5, 1998
INVENTOR(S) : STEYER, et al.

It is certified that error appears in the above-indentified patent and that said Letters Patent is hereby corrected as shown below:

On the title page, item [73] should read;   -- General Electric Company --

Signed and Sealed this

Twenty-fifth Day of August, 1998

*Attest:*

BRUCE LEHMAN

*Attesting Officer*  *Commissioner of Patents and Trademarks*